US010848314B2

(12) United States Patent
Wang et al.

(10) Patent No.: US 10,848,314 B2
(45) Date of Patent: Nov. 24, 2020

(54) BLOCKCHAIN DATA PROCESSING METHODS, APPARATUSES, PROCESSING DEVICES, AND SYSTEMS

(71) Applicant: Advanced New Technologies Co., Ltd., George Town (KY)

(72) Inventors: Husen Wang, Hangzhou (CN); Xuming Lu, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

(21) Appl. No.: 16/750,993

(22) Filed: Jan. 23, 2020

(65) Prior Publication Data

US 2020/0162259 A1    May 21, 2020

Related U.S. Application Data

(63) Continuation of application No. 16/408,218, filed on May 9, 2019, now Pat. No. 10,581,610.

(30) Foreign Application Priority Data

May 10, 2018  (CN) .......................... 2018 1 0444320

(51) Int. Cl.
*H04L 9/32*      (2006.01)
*H04L 29/06*     (2006.01)

(52) U.S. Cl.
CPC .......... *H04L 9/3228* (2013.01); *H04L 9/3247* (2013.01); *H04L 9/3263* (2013.01); *H04L 63/0442* (2013.01); *H04L 2209/38* (2013.01)

(58) Field of Classification Search
None
See application file for complete search history.

(56) References Cited

U.S. PATENT DOCUMENTS 8,468,355 B2   6/2013  Gerdes et al.
10,567,174 B2  2/2020  Wang et al.
(Continued)

FOREIGN PATENT DOCUMENTS

CN    106504008    3/2017
CN    107949383    8/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Brandon S Hoffman
(74) *Attorney, Agent, or Firm* — Fish & Richardson P.C.

(57) ABSTRACT

Techniques for processing blockchain data are described. Each contract participant of a plurality of contract participants in a blockchain generates, for a target contract, a paired temporary public key and private key generated based on an asymmetric encryption algorithm. Each contract participant sends the temporary public key to other contract participants. First signature data is generated by each contract participant signing data information including the target contract and temporary public keys of the contract participants by using the temporary private key. A contract participant encrypts predetermined contract information by using a regulatory key of a regulator to generate an encrypted contract signed by each contract participant using the temporary private key, to generate second signature data. Creation data is determined and submitted to the blockchain for storage, where the creation data includes the temporary public key and the second signature data of each contract participant and the encrypted contract.

17 Claims, 9 Drawing Sheets

(56) References Cited

U.S. PATENT DOCUMENTS

| | | | |
|---|---|---|---|
| 10,581,610 | B2 | 3/2020 | Wang et al. |
| 2014/0222684 | A1 | 8/2014 | Felsher |
| 2015/0220928 | A1 | 8/2015 | Allen |
| 2015/0324789 | A1 | 11/2015 | Dvorak et al. |
| 2016/0188874 | A1 | 6/2016 | Oxford et al. |
| 2016/0292672 | A1 | 10/2016 | Fay et al. |
| 2017/0155515 | A1* | 6/2017 | Androulaki ............ G06F 21/64 |
| 2017/0289111 | A1 | 10/2017 | Voell et al. |
| 2018/0075453 | A1 | 3/2018 | Durvasula et al. |
| 2019/0349199 | A1 | 11/2019 | Wang et al. |

FOREIGN PATENT DOCUMENTS

| | | |
|---|---|---|
| CN | 107464118 | 12/2017 |
| CN | 107993059 | 5/2018 |
| TW | 201816694 | 5/2018 |
| TW | 201835784 | 10/2018 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/US2019/031567, dated Jul. 17, 2019, 7 pages.

U.S. Appl. No. 16/405,616, Lu et al., filed May 7, 2019.

U.S. Appl. No. 16/408,103, Lu et al., filed May 9, 2019.

U.S. Appl. No. 16/736,357, Wang et al., filed Jan. 7, 2020.

Pinna et al., "A Blockchain-Based Decentralized System for Proper Handling of Temporary Employment Contracts", Advances in Intelligent Systems and Computing vol. 857, Nov. 2018, 13 pages.

Tian et al., "A Privacy Preserving Fair Contract Signing Protocol Based on Block Chains", Journal of Crytological Research, Mar. 2017, 12 pages (with English Abstract).

\* cited by examiner

BLOCKCHAIN DATA PROCESSING METHODS, APPARATUSES, PROCESSING DEVICES, AND SYSTEMS

CROSS-REFERENCE TO RELATED APPLICATIONS

This application is a continuation of U.S. patent application Ser. No. 16/408,218, filed on May 9, 2019, which claims priority to Chinese Patent Application No. 201810444320.4, filed on May 10, 2018, and each application is incorporated by reference in its entirety.

TECHNICAL FIELD

Solutions in implementations of the present specification pertain to the field of computer data processing technologies, and in particular, to blockchain data processing methods, apparatuses, processing devices, and systems.

BACKGROUND

With the rapid development of the Internet, various types of data explosively grow. Because of the characteristics such as decentralization, non-tampering, and transparency, the blockchain currently becomes a major focus and research direction in many technical fields.

In the current blockchain technology, blockchain data is mainly updated based on transactions, for example, digest information of transactions within a time period is formed, and the digest information is stored together with a digest in the previous blockchain to form a new block. In blockchain applications, both parties can agree on contract content or contract execution offline, and then store related data in the blockchain. In an on-chain process (a process of storing data in the blockchain), a contract can be encrypted by using some encryption methods, to protect the contract content and prevent generation of an illegal contract or an illegal modification to the contract. However, key information of contract participants may be maliciously stolen and lost in some application scenarios. Consequently, a relatively high data security risk can be generated for the blockchain, security trust of blockchain users for provided blockchain services can be reduced, and user experience is also reduced.

Therefore, there is an urgent need for a solution that can more effectively improve data security in blockchain data services.

SUMMARY

Implementations of the present specification are intended to provide blockchain data processing methods, apparatuses, processing devices, and systems, where contract participants can process data by using generated temporary keys, to generate securer and more reliable blockchain data.

The blockchain data processing methods, apparatuses, processing devices, and the systems that are provided in the implementations of the present specification are implemented in the following ways:

A blockchain data processing method is provided, and the method includes: generating temporary keys for a target contract, where the temporary keys include a temporary public key and a temporary private key that are generated based on an asymmetric encryption algorithm; and generating blockchain data of the target contract in a blockchain based on the temporary keys.

A blockchain data processing method is provided, and the method includes: receiving and storing creation data of a target contract, where the creation data includes temporary keys that are used by contract participants when generating the target contract, and generating, based on the temporary keys, data information uploaded to a blockchain after the target contract is processed, where the temporary keys include a temporary public key and a temporary private key that are generated based on an asymmetric encryption algorithm; receiving contract execution data; performing signature verification on the contract execution data by using public keys corresponding to the target contract participants; and if the signature verification succeeds, updating the stored target contract to an encrypted new contract.

A blockchain data processing apparatus is provided, and the apparatus includes: a temporary key generation module, configured to generate temporary keys for a target contract, where the temporary keys include a temporary public key and a temporary private key that are generated based on an asymmetric encryption algorithm; and a contract encryption and signature processing module, configured to generate blockchain data of the target contract in a blockchain based on the temporary keys.

A blockchain data processing device is provided, and the processing device includes a processor and a memory that is configured to store instructions that can be executed by the processor, and when executing the instructions, the processor implements the following steps: generating temporary keys for a target contract, where the temporary keys include a temporary public key and a temporary private key that are generated based on an asymmetric encryption algorithm; and generating blockchain data of the target contract in a blockchain based on the temporary keys.

A blockchain system is provided, and the blockchain system includes a blockchain terminal device and a blockchain server, where the blockchain terminal device and the blockchain server separately include at least one processor and a memory that is configured to store instructions that can be executed by the processor, and when executing the instructions, the processor of the blockchain terminal device implements: method steps according to any one of implementations related to the contract participants in the implementations of the present specification; and when executing the instructions, the processor of the blockchain server implements: method steps of data processing in the blockchain related to the contract participants in the implementations of the present specification.

According to the blockchain data processing methods, apparatuses, processing devices, and the systems that are provided in the implementations of the present specification, the contract participants can perform encryption processing in related operations of the target contract by using the keys that are temporarily generated, for example, signing, encryption, and verification of the contract. The data information obtained after the processing performed by using the temporary keys is then uploaded to the blockchain for storage, so that security processing of contract data performed by the contract participants off the chain can be effectively guaranteed, and security of data storage in the blockchain can be improved.

BRIEF DESCRIPTION OF DRAWINGS

To describe technical solutions in implementations of the present specification or in the existing technology more clearly, the following briefly describes the accompanying drawings needed for describing the implementations or the existing technology. Apparently, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

To make a person skilled in the art better understand the technical solutions in the present specification, the following clearly and comprehensively describes the technical solutions in the implementations of the present specification with reference to the accompanying drawings in the implementations of the present specification. Apparently, the described implementations are merely some rather than all of the implementations of the present specification. All other implementations obtained by a person of ordinary skill in the art based on the one or more implementations of the present specification without creative efforts shall fall within the protection scope of the implementations of the present specification.

As an Internet database technology, the blockchain technology (BT) is also referred to as a distributed ledger technology, and is characterized by decentralization, transparency, and data non-tampering. Currently, the blockchain technology is extended from pure digital currency applications to various fields of the economic society, including application scenarios such as financial services, supply chain management, cultural entertainment, real estate, health care, and e-commerce. A consortium blockchain or a private chain can be established between a plurality of user individuals or groups or agencies in a blockchain based on the technical characteristics of the blockchain, and the user individuals or groups or agencies can join the blockchain to be members of the blockchain. Data of transactions between the members can be stored in the blockchain, for example, content of a contract that is signed off the chain can be stored in the blockchain.

It is worthwhile to note that the "off the chain" in the implementations of the present specification or "on the chain" in subsequent descriptions mainly indicates whether a data operation is performed in the blockchain. For example, operations, such as negotiation and contract signing performed by users offline, and identity authentication and certificate issuance performed by a certification authority, that are performed off the blockchain can be related operations off the chain, and operations such as submitting a public key or a certificate to the blockchain, verification performed by a blockchain node, and data storage can be related operations on the chain, for example, an operation of submitting data to the blockchain for storage can be referred to as an on-chain operation.

Figure 1:
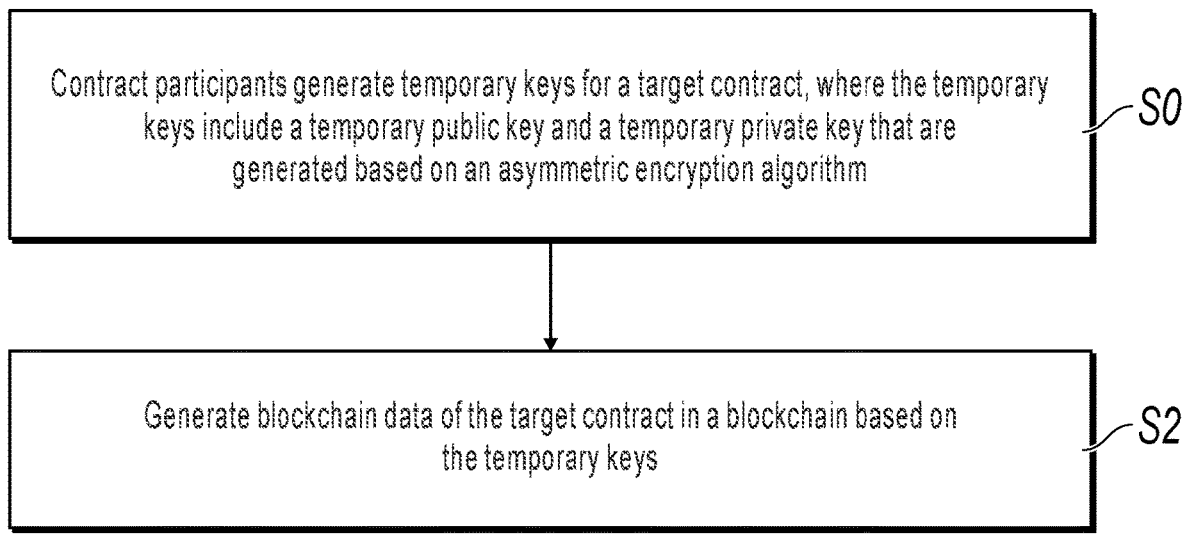
FIG. 1 is a schematic diagram illustrating a processing procedure of an implementation of a method, according to the present specification.

A conventional contract is usually recorded on paper after contract participants negotiate and reach a consensus through discussion. The contract in the implementations of the present specification can be digitally recorded in the blockchain or recorded in the blockchain in other computer data storage ways (e.g., quantum computer). The contract in the implementations of the present specification can include contract creation and contract execution. The creation can include the following: drafting a standard form contract in advance by one or more contract participants or a third party, where some necessary rights/obligations can be predetermined, and specific items of the standard form contract can be set and determined based on cooperation demands of the participants. After the standard form contract is determined, the standard form contract can be stored in the blockchain after being processed by using temporary keys, and data corresponding to the standard form contract can be referred to as creation data. That the contract participants fill, modify, and update contract content based on the standard form contract to generate a new contract or the contract participants confirm the content and sign the contract to bring the contract into force can be referred to as contract execution. For example, contract participants A and B reach a consensus on an execution process of target contract T_C (a pre-created standard form contract) offline, and a new contract including new content of the contract is generated. Content of the new contract can be stored in the blockchain after being processed by using temporary keys. During contract creation and contract execution in the solutions of the one or more implementations of the present specification, the blockchain node can perform processing by using temporary keys. FIG. 1 is a schematic flowchart illustrating an implementation of a blockchain data processing method, according to the present specification. As shown in FIG. 1, the method can include the following steps.

S0: Generate temporary keys for a target contract, where the temporary keys include a temporary public key and a temporary private key that are generated based on an asymmetric encryption algorithm.

Generally, contract participants can generate temporary keys corresponding to a certain target contract, and different contract participants can independently generate respective temporary keys. In other implementation solutions, temporary keys of all or some of the contract participants can be designated by a certain processing device, and then distributed to corresponding contract participants based on a specific rule. As such, for processing terminal devices of the contract participants, the contract participants can generate (determine) the temporary keys for the target contract by using the received temporary keys to act on the target contract. The contract participants usually indicate participants related to the contract, for example, participants A and B related to contract content. In the present implementation, the contract participants can further include other agreed participants, for example, a third party, a guarantor, and a regulator that are unrelated to the contract service content. The contract can be in a plurality of forms. For example, the same contract participants can create different contracts, for example, contract participants A and B can create both contract T_C1 and contract T_C2. The same participant can create different contracts with different partners, for example, contract participants A and B can create contract T_C3; meanwhile, contract participants A and D can create contract T_C4. For ease of description, in the present implementations, a contract processed by the contract participants can be referred to as the target contract. The target contract can correspond to other names in other subsequent processing such as contract execution and status change.

In some implementations of the present specification, encryption or signature processing can be performed by using the temporary keys during contract processing such as determining of the contract content and contract encryption. In the present implementation, in application scenarios of blockchain data processing, the temporary keys can be generated by using the asymmetric encryption algorithm, and the temporary keys can include the temporary public key and the temporary private key. Different from a symmetric encryption algorithm, the asymmetric encryption algorithm needs two keys: a public key and a private key. The public key and the private key are in pairs. If data is encrypted by using the public key, only the corresponding private key can decrypt the data. If data is encrypted by using the private key, only the corresponding public key can decrypt the data. In some implementations of the present specification, applications of the temporary keys mainly include the following: After encryption is performed by using the temporary public key, the temporary private key is used to perform decryption, and after signature is performed by using the temporary private key, the temporary public key is used to perform verification. Algorithms used in asymmetric encryption can include RSA, Elgamal, knapsack algorithm, Rabin, D-H, elliptic curve cryptography (ECC), etc.

S2: Generate blockchain data of the target contract in a blockchain based on the temporary keys.

The target contract is processed by using the temporary keys, and the generated blockchain data can be stored in the blockchain. For example, contract participants A and B sign, by using respective private keys, target contract T_C1 on which contract participants A and B reach a consensus, and then upload target contract T_C1 to the blockchain. Alternatively, other data processing can be further included based on data processing demands of the blockchain, for example, after the contract is encrypted, the respective private keys of the contract participants are used to perform signing, or an on-chain operation is performed on the encrypted contract obtained after signature and public keys of the contract participants.

In the present specification, the temporary keys are updated in a customized way. Generally, one temporary key pair is used for one contract, so that security of the blockchain data can be more effectively improved. In some implementations of the present specification, the temporary keys can be used to perform associated encryption processing or signature processing on a target contract, for example, contract participant A uses different temporary key pairs each time processing different target contracts. In other implementations, one temporary key pair can be used a plurality of times. If a temporary key pair of contract participant A is valid for data processing of only three contracts, a new key pair needs to be used when the fourth contract is processed. Alternatively, in other implementations, the temporary keys can be changed based on the contract participants. For example, the same temporary keys PK1 and SK1 are used for a plurality of contracts of contract participant A and contract participant B, and if new contract participant C joins, in other words, participants related to the contract include contract participants A, B, and C, contract participant A needs to use new temporary keys PK2 and SK2, or new temporary keys PK3 and SK3 are used for a contract signed by contract participant A and contract participant C. Similarly, contract participants B or C can also execute the same temporary key replacement policy with reference to the method of contract participant A. In the previous descriptions, PK indicates a public key, and SK indicates a private key. In the following descriptions, TPK or tpk indicates a temporary public key, and corresponding TSK or tsk indicates a temporary private key, for example, tpk_A can represent a temporary public key of contract participant A.

Therefore, in another implementation of the method in the present specification, the temporary keys can be as follows.

S02: Update the temporary keys based on at least one of different contract participants or different target contracts.

For example, a new temporary public key and a new temporary private key can be generated for a changed contract participant or for different target contract content. For example, when contract participants A and B sign different contracts, different temporary key pairs can be used. When contract participants A and B sign a contract that is the same as the contract signed by contract participants A and C, contract participant A uses different temporary key pairs for contract participants B and C. In addition, different target contracts can include different contract content, and can include different contract signing times. If contract participants and contract content remain unchanged, the temporary keys can be updated when contract data processing is performed at different times or in different time periods. In an implementation, the temporary keys are changed for different transaction participants or are changed during each transaction, so that transactions in the blockchain are difficult to be associated, illegal or other malicious data analysis of the blockchain ledger data can be effectively prevented, and security of the blockchain data can be effectively improved.

In another implementation, the temporary keys can be periodically changed based on a predetermined setting, for example, a temporary key pair of each contract participant is changed once a day. The replacement period can be uniformly predetermined, or different replacement frequencies can be set based on rights of contract participants (e.g., weight, an identity of party A or party B, credit level, and shares). For example, contract participant A is an important asset management party, a temporary key pair of contract participant A is changed once a day, and temporary key pairs of partners B and C of contract participant A are replaced once a week. Therefore, in another implementation of the method in the present specification, the temporary keys include the following.

S04: Update the temporary keys based on a predetermined replacement period.

For example, both a temporary key update policy based on the replacement period and a temporary key update policy based on rights of contract participants are used, and the same replacement period is set for contract participants with the same rights, or different replacement periods are set for contract participants with the same rights. For example, party A changes a temporary key pair every day, party B changes a temporary key pair every week, and party C changes a temporary key pair every three days.

In some implementations of the present specification, the updated key information can still be kept in the blockchain node.

In the present implementation of the present specification, data information obtained after the processing performed by using the temporary keys is then uploaded to the blockchain for storage, so that security processing of contract data performed by the contract participants off the chain can be effectively guaranteed, and security of data storage in the blockchain can be improved.

Figure 2:
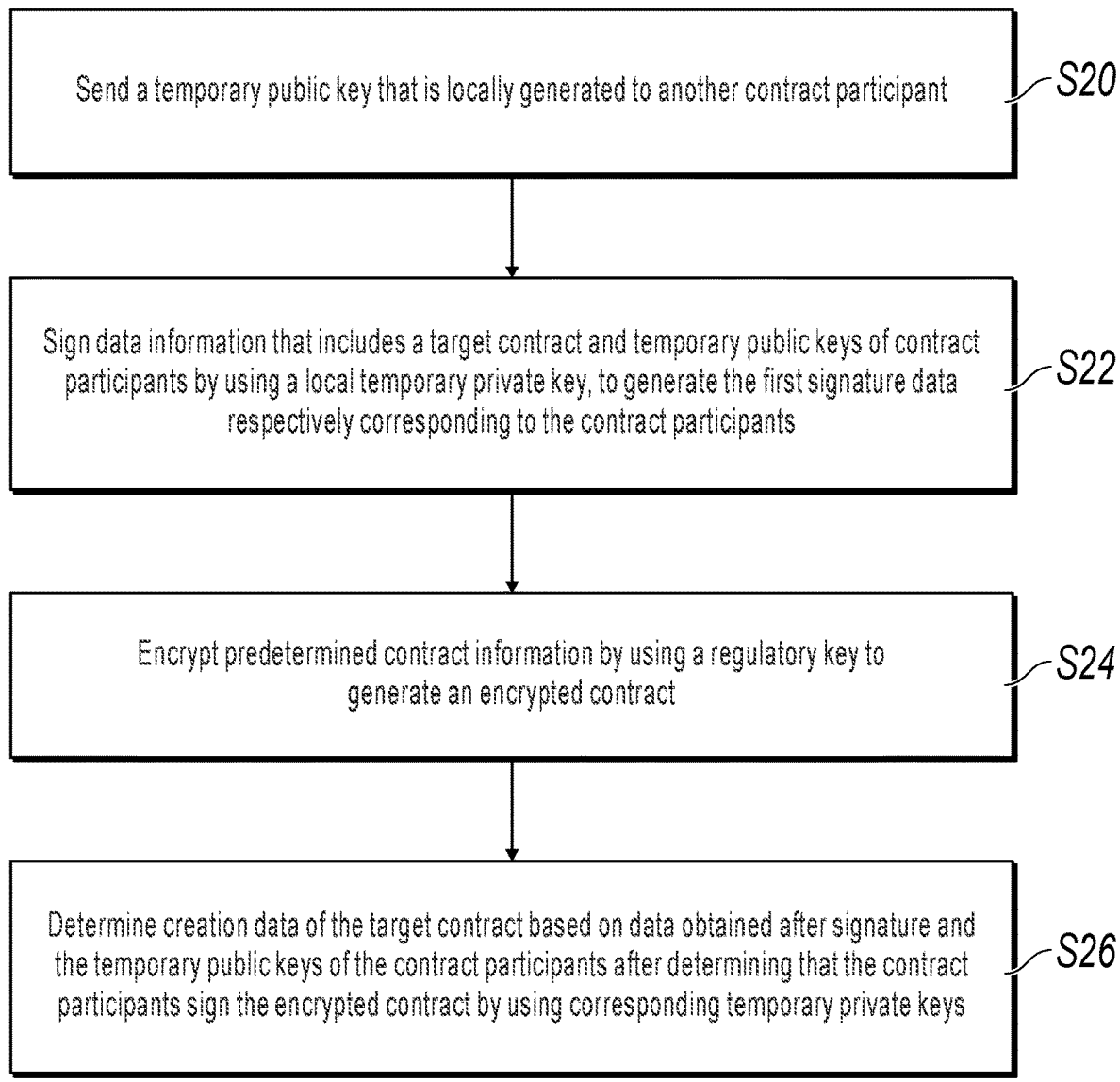
FIG. 2 is a schematic diagram illustrating an implementation of a method for performing data processing by using temporary keys in a contract creation process, according to the present specification.

The following describes the implementation solutions of the present specification by using another specific application scenario of contract creation as an example. Specifically, FIG. 2 is a schematic flowchart illustrating an implementation of a blockchain data processing method, according to the present specification. Although the present specification provides method operation steps or apparatus structures shown in the following implementations or the accompanying drawings, the method or apparatus can include more or fewer operation steps or module units after combination based on conventional or non-creative efforts. In steps or structures that have no necessary logical causal relationship, an execution sequence of the steps or a module structure of the apparatus is not limited to an execution sequence or a module structure shown in the implementations or the accompanying drawings of the present specification. In an actual apparatus, server, or terminal product application, the method or the module structure can be performed sequentially or in parallel based on the method or the module structure shown in the implementations or the accompanying drawings (e.g., a parallel processor or a multi-threaded processing environment, or even an implementation environment including distributed processing and server clustering).

The contract creation can include creation of the previous standard form contract, or can include signing and confirmation of a contract. Subsequently, contract execution can be further included. Descriptions in the following implementations do not constitute a limitation on other extensible technical solutions based on the present specification. For example, in other implementation scenarios, data operation that a single party or two or more parties need to store a memorandum, a contract, a rule, a report, a public notification, etc. in a blockchain to update data of a blockchain node. A specific implementation is shown in FIG. 2, in another implementation of the method provided in the present specification, the blockchain data includes creation data of a target contract, and the creation data is determined in the following way:

S20: Contract participants send temporary public keys in temporary keys that are respectively generated to each other.

S22: The contract participants sign data information that includes the target contract and the temporary public keys of the contract participants by using local temporary private keys, to generate the first signature data respectively corresponding to the contract participants.

S24: Encrypt predetermined contract information by using a regulatory key of a regulator to generate an encrypted contract, where the predetermined contract information includes the target contract, the temporary public keys of the contract participants, and the first signature data.

S26: Determine the creation data of the target contract based on data obtained after signature and the temporary public keys of the contract participants after determining that the contract participants sign the encrypted contract by using the corresponding temporary private keys.

Figure 3:
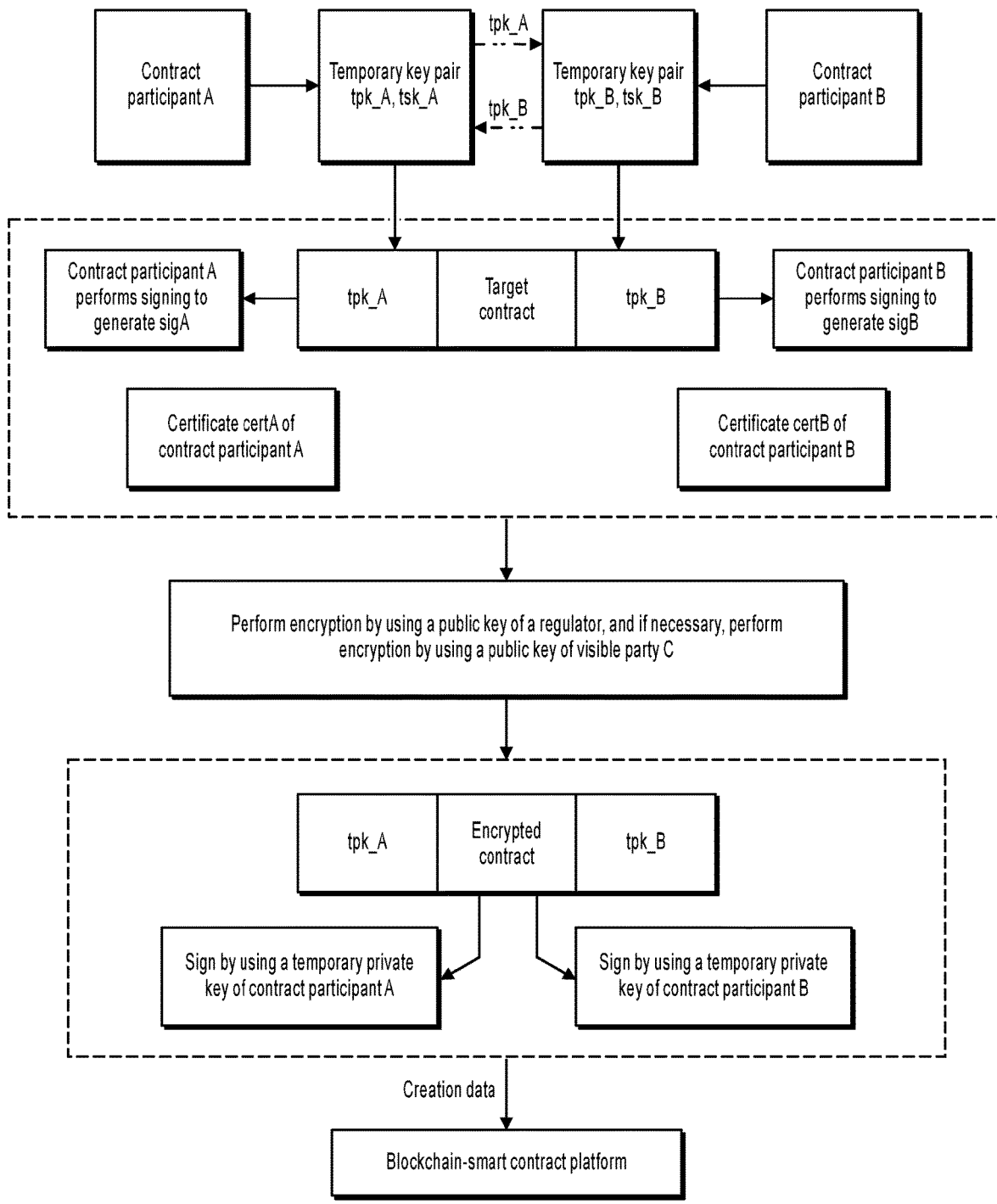
FIG. 3 is a schematic diagram illustrating an example of implementing data processing by using temporary keys in a contract creation process, according to the present specification.

During implementation of S20, it can be understood that a processing device of a single-side contract participant sends a temporary public key that is locally generated to another contract participant. The another contract participant usually includes a contract participant related to interests of both parties or a participant that signs the contract. In another implementation, other predetermined legal participants can also be included. An on-chain operation can be directly performed on the generated creation data, and the creation data is stored in the blockchain as blockchain data, or the creation data is stored after other data processing is performed before the on-chain operation or after the on-chain operation. FIG. 3 is a schematic diagram illustrating an example of implementing data processing by using temporary keys in a contract creation process, according to the present specification. As shown in FIG. 3, assume that a target contract includes contract participants A and B. Contract participants A and B are members of a consortium chain and respectively have corresponding certificates. The certificates can prove that the contract participants are legal members in a blockchain and can perform processing such as contract creation and contract execution in the blockchain.

Contract participants A and B can independently generate respective temporary key pairs: (tpk_A, tsk_A) and (tpk_B, tsk_B). Data transmission can be performed on temporary public keys of the two parties by using an established end-to-end encrypted channel. For example, an end-to-end encrypted channel based on a Secure Sockets Layer (SSL) protocol. As such, security of data transmission can be further improved. To support end-to-end offline communication demands of two users in the blockchain, the users (including contract participants) usually need to mutually check identities, can communicate with the blockchain, query an identity of the other party by using the blockchain, and determine that the other party is a legal user in the blockchain through verification. A specific procedure can include the following:

(1). Users A and B can register entity information and digital identities with a blockchain platform in a form of a smart contract or a non-smart contract by using a blockchain registration authority. The blockchain platform checks a signature of the registration authority. After the signature is verified, the entity information and the digital identities of users A and B are stored in the blockchain. The digital identity can include a public key, a private key, etc. of a user, and the entity information can include information such as a name and an identity card of a user.

(2). Users A and B establish an encrypted channel. Users A and B first send a digital identity digest of the other party to the blockchain platform. After identifying that users A and B are legal users, the platform returns acknowledgement messages to users A and B. Otherwise, the platform returns failure message, and communication between users A and B stops.

(3) To confirm an identity of user B, user A can obtain query authorization (i.e., a signature for a query request of user A) from user B, and submit a query application to the blockchain. Similarly, user B submits a query application for querying user A through the same step.

(4). If the blockchain platform checks query and authorization signatures of users A and B, and identifies that users A and B are blockchain users, the blockchain platform sends entity information of user A to user B, and sends entity information of user B to user A. If user A or user B is not a blockchain user, the blockchain platform returns a failure message. Communication between users A and B stops.

(5). After verifying the entity information of the other party, users A and B establish the encrypted channel by using the digital identities, and exchange messages, for example, exchange temporary public keys.

After sending the temporary public keys to each other, users A and B can sign (contract content of the target contract, tpk_A, and tpk_B) by using respective private keys, to generate data after signing is performed by using the respective private keys. As such, the data can be collectively referred to as the first signature data. Similarly, a signature for the contract content of the target contract can be briefly referred to as a signature for the target contract. For example, user A can sign (the target contract, tpk_A, and tpk_B) by using private key tsk_A, to generate first signature data sigA of user A, and user B can sign (the target contract, tpk_A, and tpk_B) by using private key tsk_B, to generate first signature data sigB of user B. The first signature data can also be mutually sent, for example, user A sends sigA to user B.

In application scenarios of some implementations, a contract transaction can be regulated by a regulator, and the regulator can review, audit, exam, and block a contract, and regulate illegal behaviors that are based on the contract. In some implementations, the regulator can include legal regulatory authorities, for example, national financial regulatory authorities such as the People's Bank of China and the China Securities Regulatory Commission, and the regulators can regulate blockchain transactions by using a regulatory key. In other implementations, a regulator that has a regulatory effect can also be agreed on in advance in contract rules, for example, one or more specified members. Alternatively, in another implementation, it can be stipulated that if a predetermined quantity or proportion of members approve of a certain member, the member has a regulatory right. The predetermined quantity or proportion of members can constitute a regulatory member group, for example, the blockchain includes ten members, and it can be stipulated that if seven members or 70% of the members approve of member A, member A can serve as a regulator.

Therefore, in the implementation scenario of the present implementation, related information of the target contract can be encrypted by using the regulatory key of the regulator. The regulatory key of the regulator in the implementation scenario of the present implementation can be a public key based on an asymmetric encryption algorithm. The regulatory key can also be generated by using other encryption algorithms in other implementations of the present specification. Information content encrypted by using the public key that is broadcast by the regulator can include the target contract (the contract content), temporary public keys of all contract participants, and signature data of all the contract participants, or can further include certificates of all the contract participants. For example, contract participant A encrypts (the target contract, tpk_A, tpk_B, sigA, sigB, certA, certB) by using the regulatory key, to generate an encrypted contract. The encrypted contract can be generated after any one of the contract participants performs processing. As such, the regulator can obtain the target contract from the blockchain by using a corresponding decryption key such as a private key, and verify whether the contract participants are illegal and whether the contract content is illegal, etc., to regulate and restrict the contract in the blockchain. For example, if the regulator uses a decrypted contract, reviews the contract content and foreign partners, and finds that there is an illegal transfer of technologies related to a defense patent in the contract, the regulator can block the contract by submitting the blockchain transaction. In other implementations, if a transaction related to the target contract is visible to another blockchain member C, encryption can also be performed by using a public key of blockchain member C. For a processing method of using the public key of member C and decrypting and viewing the target contract by member C by using a private key, references can be made to processing performed by the previous regulator. Details are omitted here for simplicity.

Before an on-chain operation is performed on the generated encrypted contract, the contract participants can sign the encrypted contract by using private keys, and data obtained after signature and the temporary public keys tpk_A and tpk_B of the contract participants are used as creation data stored in the blockchain.

The creation data can be submitted to the blockchain for storage. A smart contract platform can be further arranged in the blockchain, and the creation data can be submitted to the smart contract platform and managed by the smart contract platform.

Figure 4:
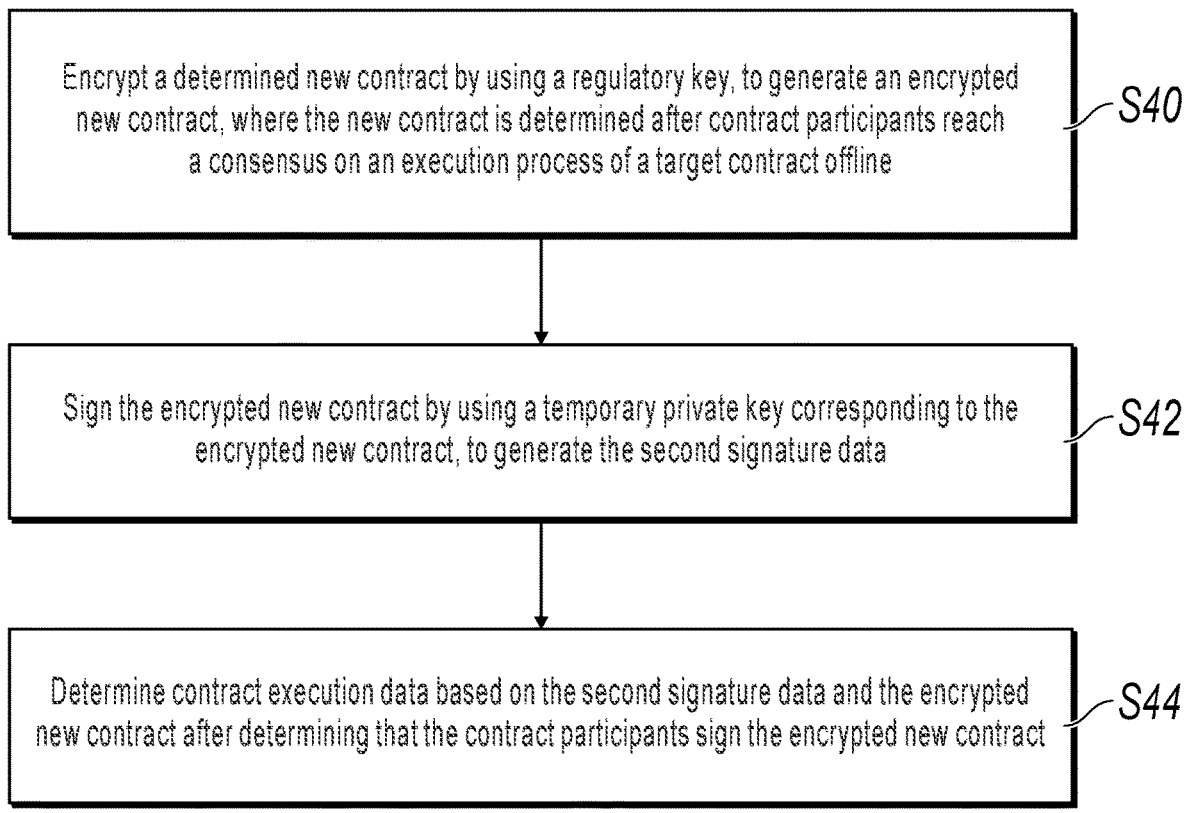
FIG. 4 is a schematic flowchart illustrating an implementation of contract execution in a blockchain data processing method, according to the present specification.

In the previous implementation, an implementation scenario of performing processing by using temporary keys in a process of creating a contract and storing the contract in a blockchain is described. The following describes an implementation scenario of performing processing by using temporary keys during contract execution. FIG. 4 is a schematic flowchart illustrating an implementation of contract execution in a blockchain data processing method, according to the present specification. As shown in FIG. 4, blockchain data can further include contract execution data, and the contract execution data is determined in the following way:

S40: Encrypt a determined new contract by using a regulatory key, to generate an encrypted new contract, where the new contract is determined after contract participants reach a consensus on an execution process of a target contract offline.

S42: The contract participants can sign the encrypted new contract by using temporary private keys corresponding to the encrypted new contract, to generate the second signature data.

S44: Determine contract execution data based on the second signature data and the encrypted new contract.

For execution processing of S42, it can be understood that processing apparatuses of the contract participants determine the contract execution data based on the second signature data and the encrypted new contract after determining that the contract participants sign the encrypted new contract. For example, after a contract participant determines that all other contract participants (including the contract participant itself) perform signing by using the temporary private keys, the second signature data obtained after the parties perform signing and the encrypted new contract are determined as the contract execution data. Then, the contract execution data can be submitted to a blockchain. The temporary keys corresponding to the encrypted new contract in S42 can be the same as or different from temporary keys used when the target contract corresponding to the encrypted new contract is created. For example, if a temporary key replacement period is reached when a new contract is determined by signing updated contract content, temporary keys used for signing the encrypted new contract are different from temporary keys used when a corresponding target contract is created and stored in a blockchain.

Updated temporary keys can be updated to corresponding data in the blockchain by submitting a transaction.

Figure 5:
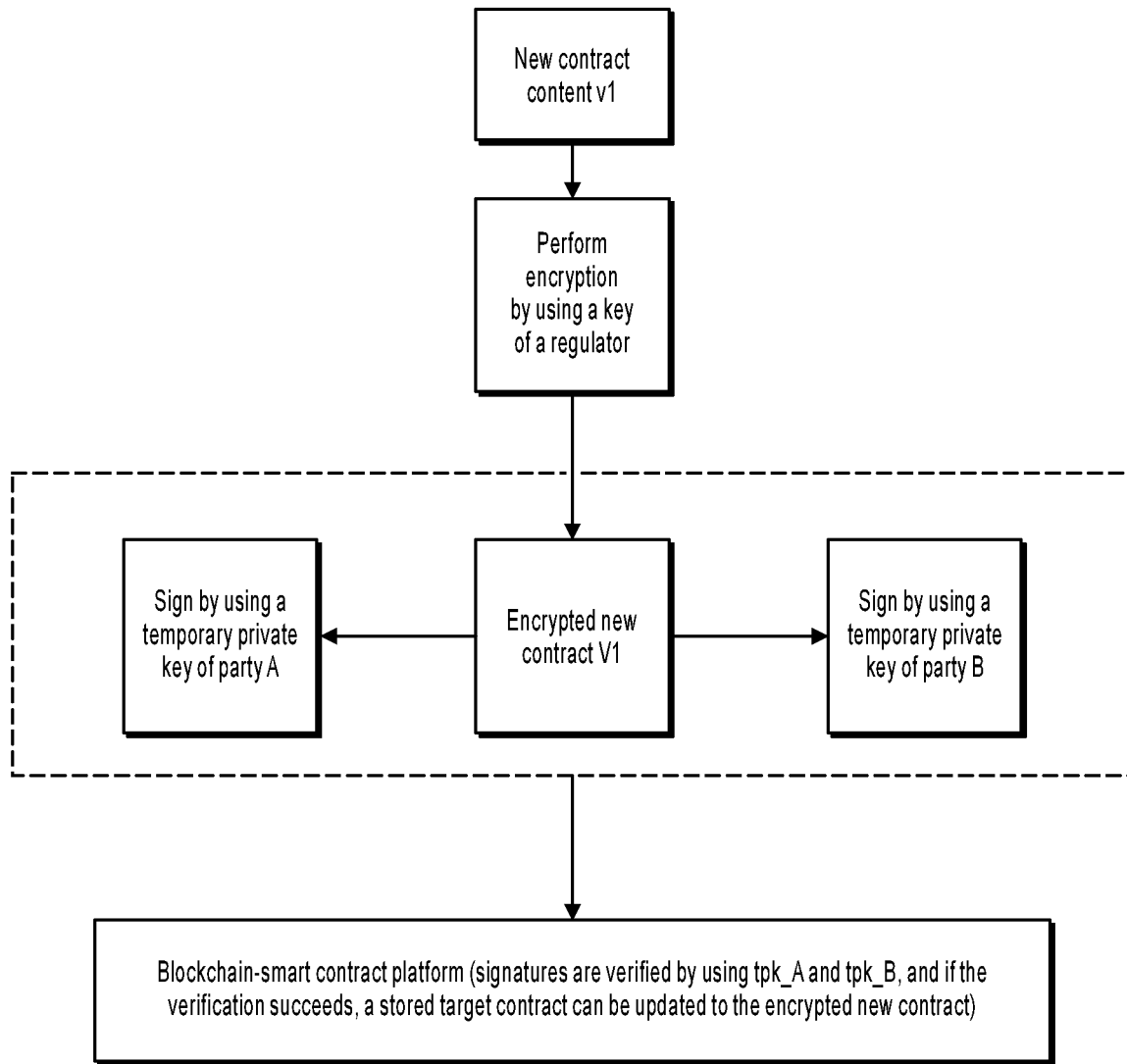
FIG. 5 is a schematic diagram illustrating an example of implementing data processing by using temporary keys in a contract execution process, according to the present specification.

FIG. 5 is a schematic diagram illustrating an example of implementing data processing by using temporary keys in a contract execution process, according to the present specification. As shown in FIG. 5, assume that contract execution relates to interests of parties A and B. Parties A and B reach a consensus on a contract execution process offline, for example, adding or modifying contract content, to form new contract v1. Party A or party B encrypts the new contract by using a regulatory key, to generate encrypted new contract V1. Then, contract participants can separately perform signing by using temporary private keys of a corresponding original target contract, for example, party A can perform signing by using temporary private key tsk_A used when creating the target contract, and then party B performs signing by using temporary private key tsk_B. An on-chain operation is performed on the encrypted new contract and data obtained after all the contract participants perform signing. The second signature data and data, of the encrypted new contract, that is to be submitted to a blockchain can be referred to as contract execution data, or data that has been submitted to and stored in the blockchain can also be referred to as the contract execution data. The same rule is applicable to the previous creation data of the target contract. In the present process, different from creating a new contract, parties A and B may not need to obtain authorization of a regulator in a process of transferring a contract status, for example, changing a contract, validating a contract, suspending a contract, and terminating a contract. After the contract participants perform encryption by using a regulatory public key and perform signing by using private keys to determine a new contract or a transferred contract status, contract content and the contract status can take effect. Unless otherwise specified, there is no need to obtain authorization of the regulator.

The previous implementation can be performed by processing devices of the contract participants, where the processing devices can include a device that communicates with a server of a blockchain node; or can be performed on the server of the blockchain node. Further, after the encrypted new contract obtained after signature performed by using all private keys is uploaded to the blockchain, the blockchain node can perform signature verification by using public keys corresponding to the contract, to determine validity/compliance of contract execution. For example, a smart contract platform in the blockchain can verify signatures by using public keys tpk_A and tpk_B of the target contract participants corresponding to the encrypted new contract. If the verification succeeds, the stored target contract can be updated to the encrypted new contract. Therefore, for a processing device of the blockchain node, the method can further include:

S60: Perform signature verification on the contract execution data by using the public keys corresponding to the target contract participants.

S62: If the signature verification succeeds, update the stored target contract to the encrypted new contract.

Figure 6:
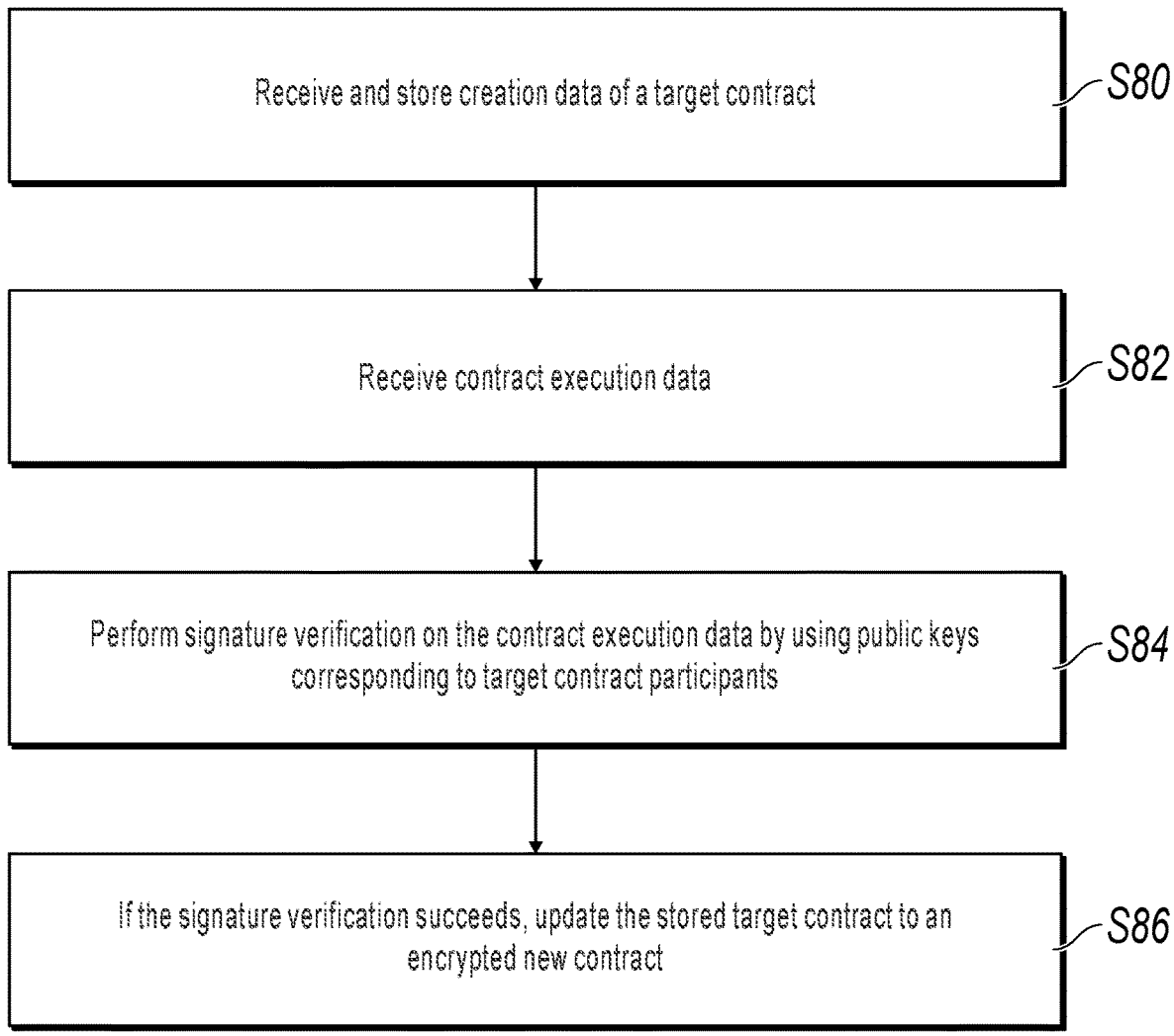
FIG. 6 is a schematic diagram illustrating a processing procedure of another implementation of a method, according to the present specification.

Based on the previous descriptions, for a processing device of a blockchain node, the present specification further provides another implementation of the method. As shown in FIG. 6, the method includes the following steps:

S80: Receive and store creation data of a target contract, where the creation data includes temporary keys that are used by contract participants when generating the target contract, and generate, based on the temporary keys, data information uploaded to a blockchain after the target contract is processed, where the temporary keys include a temporary public key and a temporary private key that are generated based on an asymmetric encryption algorithm.

S82: Receive contract execution data.

S84: Perform signature verification on the contract execution data by using public keys corresponding to the target contract participants.

S86: If the signature verification succeeds, update the stored target contract to an encrypted new contract.

It is worthwhile to note that the previous descriptions in the implementations of the present specification can be implemented on a client device in a blockchain or server of a blockchain node, for example, the client device performs contract creation and contract execution by using temporary keys, blockchain data stored in the server of the blockchain node is data obtained after processing is performed by using the temporary keys, and the server verifies contract change, contract status transfer, etc. by using a stored temporary public key.

The implementations of the method in the present specification are described in a progressive way. For same or similar parts in the implementations, references can be made to the implementations. Each implementation focuses on a difference from other implementations. For related parts, references can be made to partial descriptions in the method implementations.

Figure 7:
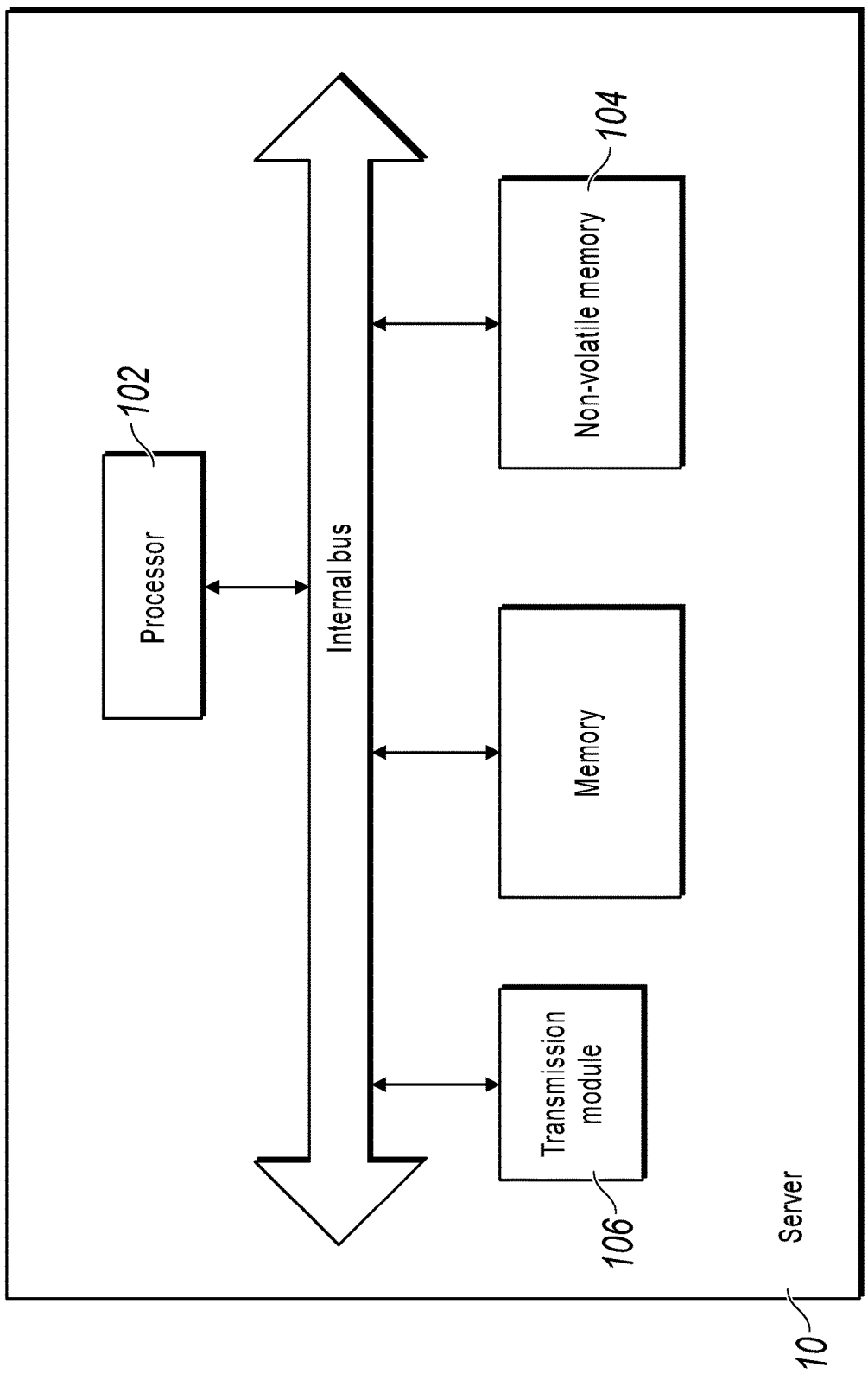
FIG. 7 is a structural block diagram illustrating hardware of a blockchain data processing device, according to an implementation of the present disclosure.

The method implementations provided in the implementations of the present application can be performed in a blockchain terminal device, a blockchain server, or a similar operation apparatus. For example, the method implementations are performed in a blockchain node device (which can be client device, a single server, or a server cluster). FIG. 7 is a structural block diagram illustrating hardware of a blockchain data processing device, according to an implementation of the present disclosure. As shown in FIG. 7, the blockchain processing device 10 can include one or more (only one shown in the figure) processors 102 (where the processor 102 can include but is not limited to a processing apparatus such as a microprocessor MCU or a programmable logic device FPGA), a memory 104 that is configured to store data, and a transmission module 106 used for a communication function. A person of ordinary skill in the art can understand that the structure shown in FIG. 7 is merely an example, and does not impose a limitation on a structure of the previous electronic apparatus. For example, the processing device 10 can further include more or fewer components than the components shown in FIG. 7. For example, the processing device 10 can further include other processing hardware such as a graphics processing unit (GPU), or the processing device 10 has a configuration different from the configuration shown in FIG. 7.

The memory 104 can be configured to store software programs of application software and modules. For example, program instructions/modules corresponding to the blockchain data processing method in the implementations of the present disclosure, and the processor 102 executes various function applications and data processing by running the software programs and the modules stored in the memory 104, in other words, implement the previous blockchain data processing method. The memory 104 can include a high-speed random access memory, and can further include a non-volatile memory, for example, one or more magnetic storage apparatuses, a flash memory, or another non-volatile solid state memory. In some examples, the memory 104 can further include memories remotely disposed relative to the processor 102. The remote memories can be connected to the processing device 10 by using a network. For example, the previous network includes but is not limited to the Internet, an intranet, a local area network, a mobile communications network, and a combination thereof.

The transmission module 106 is configured to receive or send data by using a network. For example, the previous network can specifically include a wireless network provided by a communication supplier of the processing device 10. For example, the transmission module 106 includes a network adapter (e.g., Network Interface Controller, NIC). The network adapter can be connected to another network device by using a base station, to communicate with the Internet. For example, the transmission module 106 can be a radio frequency (RF) module, and is configured to communicate with the Internet by using a wireless method.

Figure 8:
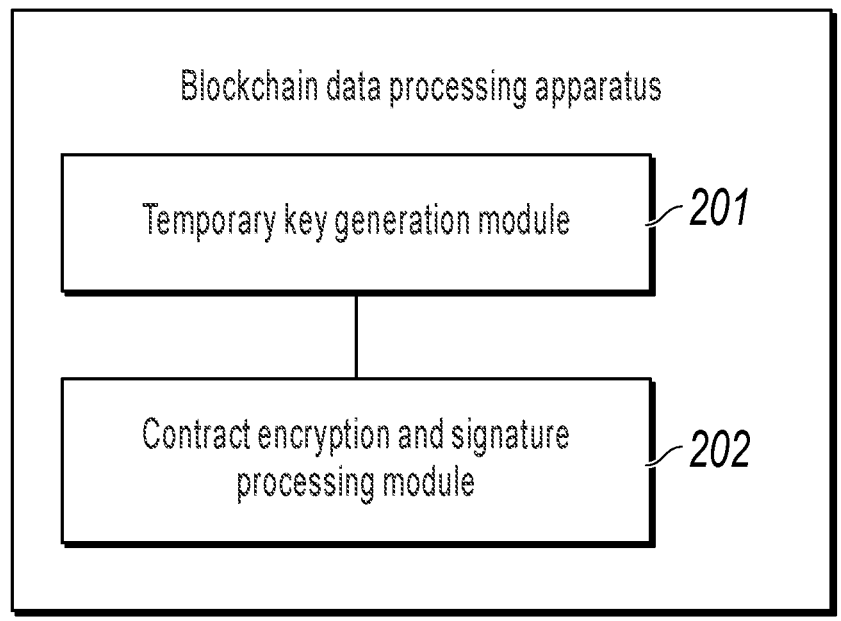
FIG. 8 is a schematic structural diagram illustrating modules in a blockchain data processing apparatus implementation, according to the present specification.

Based on the previous blockchain data processing method, the present specification further provides a blockchain data processing apparatus. The apparatus can include an apparatus using a system (including a distributed system), software (an application), a module, a component, a server, a client device, etc. in the method in the implementations of the present specification and including necessary implementation hardware. Based on the same innovative idea, a processing apparatus in an implementation provided in the present specification is described as follows. Because an implementation solution of the apparatus for alleviating a problem is similar to the implementation solution of the method, for specific implementation of the processing apparatus in the implementations of the present specification, references can be made to the implementation of the previous method. No repeated description is provided. Although the apparatus described in the following implementations is preferably implemented by software, implementation of hardware or a combination of software and hardware is possible to conceive. As shown in FIG. 8, a blockchain data processing apparatus can include the following modules: a temporary key generation module 201, configured to generate temporary keys for a target contract, where the temporary keys include a temporary public key and a temporary private key that are generated based on an asymmetric encryption algorithm; and a contract encryption and signature processing module 202, configured to generate blockchain data of the target contract in a blockchain based on the temporary keys.

It is worthwhile to note that the processing apparatus described in the present implementation of the present specification can further include another implementation method based on the descriptions in related method implementations. For a specific implementation, references can be made to the descriptions in the method implementations. Details are omitted here for simplicity.

The blockchain data processing method provided in the present specification can be implemented by a processor executing a corresponding program instruction in a computer. For example, the device version identification method can be implemented at a PC end or a server side by using the C++/java language in a Windows/Linux operating system, or implemented by using a corresponding program design language in another system such as Android or iOS and necessary hardware, or implemented based on processing logic of a quantum computer. Specifically, in an implementation in which a processing device implements the previous method provided in the present specification, the processing device can include a processor and a memory that is configured to store instructions that can be executed by the processor, and when executing the instructions, the processor implements the following steps: generating temporary keys for a target contract, where the temporary keys include a temporary public key and a temporary private key that are generated based on an asymmetric encryption algorithm; and generating blockchain data of the target contract in a blockchain based on the temporary keys.

Based on the previous method implementations, in another implementation of the apparatus, the temporary keys are updated based on at least one of different contract participants or different target contracts.

Based on the previous method implementations, in another implementation of the apparatus, the temporary keys are updated based on a predetermined replacement period.

Based on the previous method implementations, in another implementation of the device, the processor performs the following steps to determine creation data of the target contract: sending the temporary public key that is locally generated to another contract participant; signing data information that includes the target contract and temporary public keys of contract participants by using the local temporary private key, to generate the first signature data respectively corresponding to the contract participants; encrypting predetermined contract information by using a regulatory key of a regulator to generate an encrypted contract, where the predetermined contract information includes the target contract, the temporary public keys of the contract participants, and the first signature data; and determining the creation data of the target contract based on data obtained after signature and the temporary public keys of the contract participants after determining that the contract participants sign the encrypted contract by using corresponding temporary private keys.

Based on the previous method implementations, in another implementation of the device, the processor further performs the following step: submitting the creation data to the blockchain.

Based on the previous method implementations, in another implementation of the device, the processor performs the following steps to determine contract execution data: encrypting a determined new contract by using the regulatory key, to generate an encrypted new contract, where the new contract is determined after the contract participants reach a consensus on an execution process of the target contract offline; signing the encrypted new contract by using a temporary private key corresponding to the encrypted new contract, to generate the second signature data; and determining the contract execution data based on the second signature data and the encrypted new contract after determining that the contract participants sign the encrypted new contract.

Based on the previous method implementations, in another implementation of the device, that the processor sends the temporary public key includes: performing data transmission by using an established end-to-end encrypted channel.

In an implementation in which another processing device implements the previous method provided in the present specification can be applied to data processing in a blockchain, for example, a server of a smart contract platform in the blockchain, or a blockchain node server. Specifically, in an implementation, the processing device can include a processor and a memory that is configured to store instructions that can be executed by the processor, and when executing the instructions, the processor implements the following steps: receiving and storing creation data of a target contract, where the creation data includes temporary keys that are used by contract participants when generating the target contract, and generating, based on the temporary keys, data information uploaded to a blockchain after the target contract is processed, where the temporary keys include a temporary public key and a temporary private key that are generated based on an asymmetric encryption algorithm; receiving contract execution data; performing signature verification on the contract execution data by using public keys corresponding to the target contract participants; and if the signature verification succeeds, updating the stored target contract to an encrypted new contract.

The previous instructions can be stored in a plurality of types of computer readable storage medium. The computer readable storage medium can include a physical apparatus that is configured to store information. The information can be digitized and then stored by using media that uses an electric way, a magnetic way, an optic way, etc. The computer readable storage medium in the present implementation can include: an apparatus that stores information in an electric energy way, for example, various memories such as a RAM and a ROM; an apparatus that stores information in a magnetic energy way, for example, a hard disk, a floppy disk, a magnetic tape, a magnetic core memory, a bubble memory, or a USB flash drive; and an apparatus that stores information in an optical way, for example, a CD or a DVD. There can be a readable storage medium in another form such as a quantum memory or a graphene memory. The apparatus, the server, the client device, the processing device, or instructions in a system in the present implementation are the same as the previous descriptions.

Based on the previous descriptions, an implementation of the present specification further provides a blockchain system. The system includes a blockchain terminal device and a blockchain server. The blockchain terminal device and the blockchain server separately include at least one processor and a memory that is configured to store instructions that can be executed by the processor. When executing the instructions, the processor of the blockchain terminal device implements the following: method steps according to any one of implementations related to the contract participants in the implementations of the method.

When executing the instructions, the processor of the blockchain server implements the following: method steps of data processing in the blockchain related to the contract participants in the implementations of the method.

Architectures of the blockchain terminal device and the blockchain node server can be architectures of a client device/server. In some implementation scenarios, the blockchain terminal device and the blockchain node server can be the same processing device.

It is worthwhile to note that the apparatus, processing device, terminal device, server, and system described in the implementations of the present specification can further include another implementation method based on the descriptions in related method implementations. For a specific implementation, references can be made to the descriptions in the method implementations. Details are omitted here for simplicity.

The implementations of the present specification are described in a progressive way. For same or similar parts in the implementations, references can be made to the implementations. Each implementation focuses on a difference from other implementations. Particularly, a hardware and program implementation is basically similar to a method implementation, and therefore is described briefly. For related parts, references can be made to partial descriptions in the method implementation.

Specific implementations of the present specification are described above. Other implementations fall within the scope of the appended claims. In some cases, the actions or steps described in the claims can be performed in an order different from the order in the implementations and the desired results can still be achieved. In addition, the process provided in the accompanying drawings does not necessarily require a particular execution order to achieve the desired results. In some implementations, multitasking and parallel processing can be advantageous.

According to the blockchain data processing methods, apparatuses, processing devices, and the systems that are provided in the implementations of the present specification, the contract participants can perform encryption processing in related operations of the target contract by using the keys that are temporarily generated, for example, signing, encryption, and verification of the contract. The data information obtained after the processing performed by using the temporary keys is then uploaded to the blockchain for storage, so that security processing of contract data performed by the contract participants off the chain can be effectively guaranteed, and security of data storage in the blockchain can be improved.

Although the present application provides the operation steps of the method described in the implementations or flowcharts, more or fewer operation steps can be included based on the conventional or non-creative efforts. The sequence of steps listed in the implementations is merely one of numerous execution sequences of the steps, and does not represent a unique execution sequence. In actual execution of an apparatus or a client product, execution can be performed based on the method sequence shown in the implementations or accompanying drawings, or performed in parallel (e.g., a parallel processor or a multi-thread processing environment).

Although the implementations of the present specification relate to operations and data descriptions such as data acquisition, description, interaction, calculation, determining, and encryption such as SSL-based encryption communication, description of contract setup and execution, and encryption and signature performed by using a public key and a private key, the implementations of the present specification are not limited to cases that comply with industry communications standards, standard asymmetric encryption algorithms, communications protocols, and standard data models/templates or cases described in the implementations of the present specification. A slightly modified implementation solution obtained by using some industry standards, or in a self-defined way, or on a basis of the described implementations can also implement an implementation effect that is the same as, equivalent to, or similar to an implementation effect of the described implementations, or an expected implementation effect obtained after transformation. An implementation that is obtained through data acquisition, storage, determining, and processing after these modifications and transformations are applied can still fall within a scope of optional implementation solutions of the present specification.

In the 1990s, whether technology improvement is hardware improvement (for example, improvement of a circuit structure such as a diode, a transistor, or a switch) or software improvement (improvement of a method procedure) can be obviously distinguished. However, as technologies develop, the current improvement for many method procedures can be considered as a direct improvement of a hardware circuit structure. A designer usually programs an improved method procedure to a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. Original code before compiling is also written in a specific programming language, which is referred to as a hardware description language (HDL). There are many HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). Currently, Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented in any appropriate method. For example, the controller can be a microprocessor, a processor, or a computer readable medium, a logic gate, a switch, an application-specific integrated circuit (ASIC), a programmable logic controller, or an embedded microcontroller that stores computer readable program code (for example, software or firmware) that can be executed by the processor (or the microprocessor). Examples of the controller include but are not limited to the following microcontrollers: ARC 625D, Atmel AT91SAM, Microchip PIC18F26K20, or Silicon Labs C8051F320. A memory controller can also be implemented as a part of control logic of the memory. A person skilled in the art also knows that a controller can be implemented by using a pure computer readable program code method, and the method steps can be logically programmed to enable the controller to implement the same functions in forms of a logic gate, a switch, an application-specific integrated circuit, a programmable logic controller, an embedded microcontroller, etc. Therefore, the controller can be considered as a hardware component, and an apparatus included in the controller and configured to implement various functions in the controller can also be considered as a structure in a hardware component. Alternatively, an apparatus configured to implement various functions can be considered as a software module that can implement the method or a structure in a hardware component.

The system, apparatus, module, or unit illustrated in the previous implementations can be implemented by using a computer chip or an entity, or can be implemented by using a product that has a certain function. A typical implementation device is a computer. Specifically, the computer can be, for example, a personal computer, a laptop computer, an in-vehicle human computer interaction device, a cellular phone, a camera phone, a smartphone, a personal digital assistant, a media player, a navigation device, an email device, a game console, a tablet computer, a wearable device, or a combination of any of these devices.

Although the implementations of the present specification provide the operation steps of the method described in the implementations or flowcharts, more or fewer operation steps can be included based on the conventional or non-creative means. The sequence of steps listed in the implementations is merely one of numerous execution sequences of the steps, and does not represent a unique execution sequence. In actual execution of an apparatus or a terminal product, execution can be performed based on the method sequence shown in the implementations or accompanying drawings, or performed in parallel (e.g., a parallel processor or a multi-thread processing environment, or even a distributed data processing environment). The term "include", "comprise", or their any other variant is intended to cover a non-exclusive inclusion, so that a process, a method, a product, or a device that includes a list of elements not only includes those elements but also includes other elements that are not expressly listed, or further includes elements inherent to such a process, method, product, or device. Without more constraints, the existence of additional identical or equivalent elements in the process, method, product, or device that includes the element is not precluded.

For ease of description, the previous apparatus is described by dividing the functions into various modules. When the implementations of the present specification are implemented, the functions of the modules can be implemented in one or more pieces of software and/or hardware, or modules that implement the same function can be implemented by using a combination of a plurality of submodules or subunits, etc. The previously described apparatus implementations are merely examples. For example, the unit division is merely logical function division and can be other division in actual implementation. For example, a plurality of units or components can be combined or integrated into another system, or some features can be ignored or not performed. In addition, the displayed or discussed mutual couplings or direct couplings or communication connections can be implemented by using some interfaces. The indirect couplings or communication connections between the apparatuses or units can be implemented in electronic, mechanical, or other forms.

A person skilled in the art also knows that a controller can be implemented by using a pure computer readable program code method, and the method steps can be logically programmed to enable the controller to implement the same functions in forms of a logic gate, a switch, an application-specific integrated circuit, a programmable logic controller, an embedded microcontroller, etc. Therefore, the controller can be considered as a hardware component, and an apparatus included in the controller and configured to implement various functions in the controller can also be considered as a structure in a hardware component. Alternatively, an apparatus configured to implement various functions can be considered as a software module that can implement the method or a structure in a hardware component.

The present disclosure is described with reference to the flowcharts and/or block diagrams of the method, the device (system), and the computer program product according to the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction apparatus. The instruction device implements a specified function in one or more processes in the flowcharts and/or in one or more blocks in the block diagrams.

These computer program instructions can be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

In typical configuration, a computing device includes one or more processors (CPU), one or more input/output interfaces, one or more network interfaces, and one or more memories.

The memory may include a non-persistent memory, a random access memory (RAM), and/or a non-volatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette, a cassette magnetic disk storage or another magnetic storage device or any other non-transmission medium. The computer storage medium can be used to store information that can be accessed by a computing device. As described in the present specification, the computer readable medium does not include computer readable transitory media (transitory media) such as a modulated data signal and a carrier.

A person skilled in the art should understand that the implementations of the present specification can be provided as a method, a system, or a computer program product. Therefore, the implementations of the present specification can use a form of hardware only implementations, software only implementations, or implementations with a combination of software and hardware. In addition, the implementations of the present specification can use a form of a computer program product implemented on one or more computer-usable storage media (including but not limited to a magnetic disk memory, a compact disc read-only memory (CD-ROM), and an optical memory) that include computer-usable program code.

The implementations of the present specification can be described in common contexts of computer executable instructions executed by a computer, such as a program module. Generally, the program module includes a routine, a program, an object, a component, a data structure, etc. executing a specific task or implementing a specific abstract data type. The implementations of the present specification can also be practiced in distributed computing environments. In these distributed computing environments, tasks are executed by remote processing devices that are connected by using a communications network. In the distributed computing environments, the program module can be located in local and remote computer storage media that include storage devices.

The implementations of the present specification are described in a progressive way. For same or similar parts in the implementations, references can be made to the implementations. Each implementation focuses on a difference from other implementations. Particularly, a system implementation is basically similar to a method implementation, and therefore is described briefly. For related parts, references can be made to partial descriptions in the method implementation. In the descriptions of the present specification, reference terms such as "an implementation", "some implementations", "example", "specific example", and "some examples" mean that specific features, structures, materials, or features described with reference to the implementations or examples are included in at least one implementation or example in the implementations of the present specification. In the present specification, the previous example expressions of the terms do not necessarily indicate the same implementation or example. In addition, the described specific features, structures, materials, or characteristics can be combined in a proper way in any one or more of the implementations or examples. In addition, a person skilled in the art can integrate or combine different implementations or examples and characteristics of different implementations or examples described in the present specification, provided that they do not conflict with each other.

The previous descriptions are merely implementations of the present specification, and are not intended to limit the implementations of the present specification. A person skilled in the art can make various modifications and changes to the implementations of the present specification. Any modifications, equivalent replacements, improvements, etc. made within the spirit and principle of the implementations of the present specification shall fall within the protection scope of the claims of the implementations of the present specification.

Figure 9:
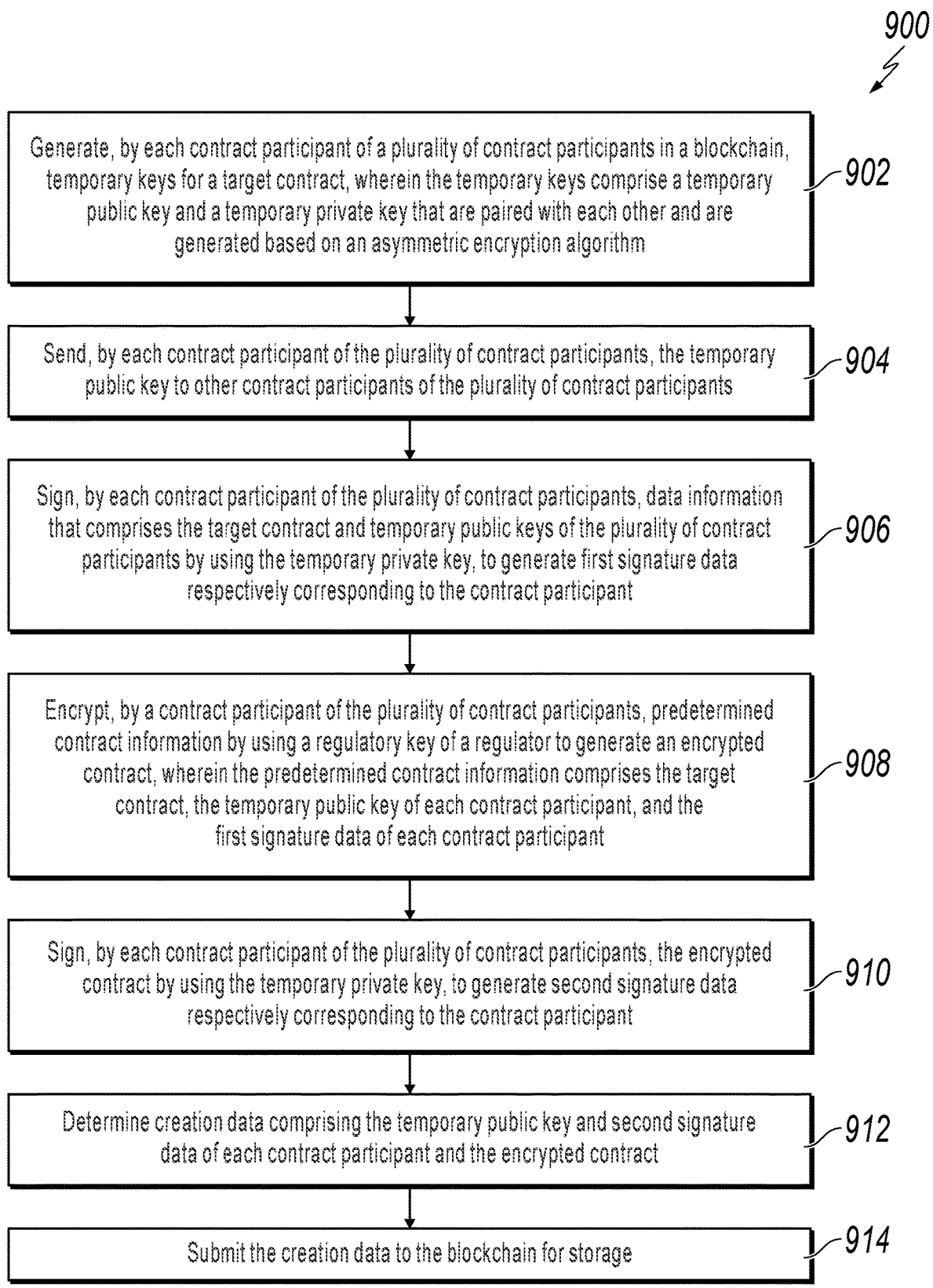
FIG. 9 is a flowchart illustrating an example of a computer-implemented method for processing blockchain data, according to an implementation of the present disclosure.

FIG. 9 is a flowchart illustrating an example of a computer-implemented method 900, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, temporary keys for a target contract are generated, by each contract participant of a plurality of contract participants in a blockchain, wherein the temporary keys comprise a temporary public key and a temporary private key that are paired with each other and are generated based on an asymmetric encryption algorithm. In some cases, the method further comprises sending, by each contract participant of the plurality of contract participants, digital identity digests of other contract participants of the plurality of contract participants to the blockchain; receiving, by each contract participant of the plurality of contract participants, a message from the blockchain, wherein the message is an acknowledgement message or a failure message; and in response to receiving an acknowledgement message from the blockchain, determining that the plurality of contract participants are legal users of the blockchain. In some examples, the temporary keys are updated based on: at least one of different contract participants and different target contracts; or a predetermined replacement period. From 902, method 900 proceeds to 904.

At 904, the temporary public key is sent, by each contract participant of the plurality of contract participants, to other contract participants of the plurality of contract participants. From 904, method 900 proceeds to 906.

At 906, data information that comprises the target contract and temporary public keys of the plurality of contract participants by using the temporary private key is signed, by each contract participant of the plurality of contract participants, to generate first signature data respectively corresponding to the contract participant. From 906, method 900 proceeds to 908.

At 908, predetermined contract information is encrypted, by a contract participant of the plurality of contract participants, by using a regulatory key of a regulator to generate an encrypted contract, wherein the predetermined contract information comprises the target contract, the temporary public key of each contract participant, and the first signature data of each contract participant. In some implementations, the predetermined contract information comprises certificates of all of the plurality of contract participants. From 908, method 900 proceeds to 910.

At 910, the encrypted contract is signed, by each contract participant of the plurality of contract participants, by using the temporary private key, to generate second signature data respectively corresponding to the contract participant. From 910, method 900 proceeds to 912.

At 912, creation data comprising the temporary public key and second signature data of each contract participant and the encrypted contract is determined. From 912, method 900 proceeds to 914.

At 914, the creation data is submitted to the blockchain for storage. In some cases, blockchain data comprises the creation data and contract execution data. In some examples, the contract execution data is determined by: determining whether the plurality of contract participants reached a consensus offline on an execution process of the target contract; in response to determining that the plurality of contract participants reached a consensus offline on the execution process of the target contract, encrypting, by a contract participant of the plurality of contract participants, a determined new contract by using the regulatory key, to generate an encrypted new contract; signing, by each contract participant of the plurality of contract participants, the encrypted new contract by using a temporary private key corresponding to the encrypted new contract, to generate second signature data respectively corresponding to the contract participant; determining, by a contract participant of the plurality of contract participants, whether the plurality of contract participants signed the encrypted new contract; and in response to determining that the plurality of contract participants signed the encrypted new contract, determining the contract execution data comprising the second signature data of each contract participant and the encrypted new contract. In some implementations, the method further comprises performing a signature verification on the contract execution data by using temporary public keys corresponding to the encrypted new contract; and in response to determining that the signature verification succeeds, updating the target contract to an encrypted new contract. After 914, method 900 can stop.

The techniques described herein can produce one or more technical effects. For example, the techniques can enable a contract participant to use a temporary private key to sign data information and the signature can be verified using a temporary public key. Using the temporary keys can make transactions in the blockchain difficult to be associated. Also, illegal or other malicious data analysis of the blockchain ledger data can be effectively prevented. This can provide additional privacy and security for the data information of a blockchain user. The techniques can also enable a contract participant to use a regulatory public key of a regulator to encrypt a contract. The contract can be decrypted by the regulator using a regulatory private key. This allows a regulator to review, audit, exam, block a contract, and regulate illegal behaviors that are based on the contract, as well as adds additional security to the contract.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   determining a first contract participant and a second contract participant of a plurality of contract participants in a blockchain;
   generating, by each contract participant of the first and the second contract participants, respective temporary keys for a target contract, wherein the temporary keys generated by the first contract participant comprise a first temporary public key and a first temporary private key that are paired with each other, and the temporary keys generated by the second contract participant comprise a second temporary public key and a second temporary private key that are paired with each other, the temporary keys generated by the first contract participant being different from the temporary keys generated by the second contract participant;
   sending, by the first contract participant, the first temporary public key to the second contract participant;
   sending, by the second contract participant, the second temporary public key to the first contract participant;
   signing, by each contract participant of the first and the second contract participants and by using a corresponding temporary private key generated by the contract participant, data information that comprises the target contract and temporary public key of the other contract participant of the first and the second contract participants, to generate a respective first signature data corresponding to the contract participant signing the data information;

encrypting, the target contract and the respective first signature data of each contract participant of the first and the second contract participants by using a regulatory key of a regulator to generate encrypted data for the target contract;

determining that the first and the second contract participants reached a consensus offline on an execution process of the target contract;

in response to determining that the first and the second contract participants reached a consensus offline on the execution process of the target contract, encrypting, by a contract participant of the first and the second contract participants, a determined new contract by using the regulatory key, to generate an encrypted new contract;

signing, by each contract participant of the first and the second contract participants, the encrypted new contract by using a temporary private key corresponding to the encrypted new contract, to generate a respective second signature data corresponding to each contract participant;

determining, by a contract participant of the first and the second contract participants, that the first and the second contract participants signed the encrypted new contract;

in response to determining that the first and the second contract participants signed the encrypted new contract, determining contract execution data comprising the respective second signature data of each contract participant and the encrypted new contract; and submitting the encrypted data to the blockchain for storage as blockchain data, wherein the blockchain data comprises the contract execution data.

2. The computer-implemented method of claim 1, further comprising:

sending, by each contract participant of the first and the second contract participants, digital identity digests of other contract participants of the first and the second contract participants to the blockchain;

receiving, by each contract participant of the first and the second contract participants, a message from the blockchain, wherein the message is an acknowledgement message or a failure message; and in response to receiving an acknowledgement message from the blockchain, determining that the first and the second contract participants are legal users of the blockchain.

3. The computer-implemented method of claim 1, wherein the temporary keys are updated based on:

at least one of different contract participants and different target contracts; or a predetermined replacement period.

4. The computer-implemented method of claim 1, wherein the target contract comprises certificates of all of the first and the second contract participants.

5. The computer-implemented method of claim 1, wherein blockchain data comprises creation data.

6. The computer-implemented method of claim 1, further comprising:

performing a signature verification on the contract execution data by using temporary public keys corresponding to the encrypted new contract; and in response to determining that the signature verification succeeds, updating the target contract to an encrypted new contract.

7. A non-transitory, computer-readable medium storing one or more instructions executable by a computer system to perform operations, comprising:

determining a first contract participant and a second contract participant of a plurality of contract participants in a blockchain;

generating, by each contract participant of the first and the second contract participants, respective temporary keys for a target contract, wherein the temporary keys generated by the first contract participant comprise a first temporary public key and a first temporary private key that are paired with each other, and the temporary keys generated by the second contract participant comprise a second temporary public key and a second temporary private key that are paired with each other, the temporary keys generated by each the first contract participant being different from the temporary keys generated by the second contract participants;

sending, by the first contract participant, the first temporary public key to the second contract participant;

sending, by the second contract participant, the second temporary public key to the first contract participant;

signing, by each contract participant of the first and the second contract participants and by using a corresponding temporary private key generated by the contract participant, data information that comprises the target contract and temporary public keys of the other contract participant of the first and the second contract participants, to generate a respective first signature data corresponding to the contract participant signing the data information;

encrypting, the target contract and the respective first signature data of each contract participant of the first and the second contract participants by using a regulatory key of a regulator to generate encrypted data for the target contract;

determining that the first and the second contract participants reached a consensus offline on an execution process of the target contract;

in response to determining that the first and the second contract participants reached a consensus offline on the execution process of the target contract, encrypting, by a contract participant of the first and the second contract participants, a determined new contract by using the regulatory key, to generate an encrypted new contract;

signing, by each contract participant of the first and the second contract participants, the encrypted new contract by using a temporary private key corresponding to the encrypted new contract, to generate a respective second signature data corresponding to each contract participant;

determining, by a contract participant of the first and the second contract participants, that the first and the second contract participants signed the encrypted new contract;

in response to determining that the first and the second contract participants signed the encrypted new contract, determining contract execution data comprising the respective second signature data of each contract participant and the encrypted new contract; and submitting the encrypted data to the blockchain for storage as blockchain data, wherein the blockchain data comprises the contract execution data.

8. The non-transitory, computer-readable medium of claim 7, further comprising:

sending, by each contract participant of the first and the second contract participants, digital identity digests of other contract participants of the first and the second contract participants to the blockchain;

receiving, by each contract participant of the first and the second contract participants, a message from the blockchain, wherein the message is an acknowledgement message or a failure message; and in response to receiving an acknowledgement message from the blockchain, determining that the first and the second contract participants are legal users of the blockchain.

9. The non-transitory, computer-readable medium of claim 7, wherein the temporary keys are updated based on:
   at least one of different contract participants and different target contracts; or
   a predetermined replacement period.

10. The non-transitory, computer-readable medium of claim 7, wherein the target contract comprises certificates of all of the first and the second contract participants.

11. The non-transitory, computer-readable medium of claim 7, wherein blockchain data comprises creation data.

12. The non-transitory, computer-readable medium of claim 7, further comprising:
   performing a signature verification on the contract execution data by using temporary public keys corresponding to the encrypted new contract; and
   in response to determining that the signature verification succeeds, updating the target contract to an encrypted new contract.

13. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      determining a first contract participant and a second contract participant of a plurality of contract participants in a blockchain;
      generating, by each contract participant of the first and the second contract participants, respective temporary keys for a target contract, wherein the temporary keys generated by the first contract participant comprise a first temporary public key and a first temporary private key that are paired with each other, and the temporary keys generated by the second contract participant comprise a second temporary public key and a second temporary private key that are paired with each other, the temporary keys generated by each the first contract participant being different from the temporary keys generated by the second contract participants;
      sending, by the first contract participant, the first temporary public key to the second contract participant;
      sending, by the second contract participant, the second temporary public key to the first contract participant;
      signing, by each contract participant of the first and the second contract participants and by using a corresponding temporary private key generated by the contract participant, data information that comprises the target contract and temporary public keys of the other contract participant of the first and the second contract participants, to generate a respective first signature data corresponding to the contract participant signing the data information;
      encrypting, the target contract and the respective first signature data of each contract participant of the first and the second contract participants by using a regulatory key of a regulator to generate encrypted data for the target contract;
      determining that the first and the second contract participants reached a consensus offline on an execution process of the target contract;
      in response to determining that the first and the second contract participants reached a consensus offline on the execution process of the target contract, encrypting, by a contract participant of the first and the second contract participants, a determined new contract by using the regulatory key, to generate an encrypted new contract;
      signing, by each contract participant of the first and the second contract participants, the encrypted new contract by using a temporary private key corresponding to the encrypted new contract, to generate a respective second signature data corresponding to each contract participant;
      determining, by a contract participant of the first and the second contract participants, that the first and the second contract participants signed the encrypted new contract;
      in response to determining that the first and the second contract participants signed the encrypted new contract, determining contract execution data comprising the respective second signature data of each contract participant and the encrypted new contract; and
      submitting the encrypted data to the blockchain for storage as blockchain data, wherein the blockchain data comprises the contract execution data.

14. The computer-implemented system of claim 13, further comprising:
   sending, by each contract participant of the first and the second contract participants, digital identity digests of other contract participants of the first and the second contract participants to the blockchain;
   receiving, by each contract participant of the first and the second contract participants, a message from the blockchain, wherein the message is an acknowledgement message or a failure message; and
   in response to receiving an acknowledgement message from the blockchain, determining that the first and the second contract participants are legal users of the blockchain.

15. The computer-implemented system of claim 13, wherein the temporary keys are updated based on:
   at least one of different contract participants and different target contracts; or
   a predetermined replacement period.

16. The computer-implemented system of claim 13, wherein the target contract comprises certificates of all of the first and the second contract participants.

17. The computer-implemented system of claim 13, wherein blockchain data comprises creation data.

* * * * *